United States Patent
Martinez-Ablanedo (10) Patent No.: US 9,489,654 B2
(45) Date of Patent: Nov. 8, 2016

(54) ARTIFICIAL INTELLIGENCE SYSTEM AND METHOD FOR PROCESSING MULTILEVEL BILLS OF MATERIALS

(71) Applicant: Airbus Operations (SAS), Toulouse (FR)

(72) Inventor: Moises Martinez-Ablanedo, Launaguet (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 64 days.

(21) Appl. No.: 14/213,113

(22) Filed: Mar. 14, 2014

(65) Prior Publication Data

US 2015/0262124 A1    Sep. 17, 2015

(51) Int. Cl.
*G06F 17/30* (2006.01)
*G06Q 10/08* (2012.01)
*G06Q 10/06* (2012.01)

(52) U.S. Cl.
CPC .......... *G06Q 10/0875* (2013.01); *G06F 17/30* (2013.01); *G06Q 10/06312* (2013.01)

(58) Field of Classification Search
None
See application file for complete search history.

(56) References Cited

U.S. PATENT DOCUMENTS 8,032,516 B2    10/2011    Kim et al.
2010/0030767 A1*    2/2010    Kim et al. .............. 707/5

OTHER PUBLICATIONS

Link Type Element Reference (Sep. 26, 2013), Developer Network.*

* cited by examiner

*Primary Examiner* — Peter L Ludwig
(74) *Attorney, Agent, or Firm* — Greer, Burns & Crain, Ltd.

(57) ABSTRACT

A bill of material (BOM) management system is provided using artificial intelligence for processing a product data or configuration change of a product between a plurality of functional domains using a dynamic link and a semantic network having product knowledge about the change via a network. A Decompose/Recompose/Multi-arrange (DRM) process module manages product configuration information of the product by performing a decompose process, a recompose process, and a multi-arrange process, wherein the decompose process performs grouping of the product elements based on the product knowledge of the semantic network, the recompose process performs regrouping of the product elements in a selected domain context, and the multi-arrange process performs rearranging of the product elements to facilitate a different product structure of the BOM in the different functional domain.

19 Claims, 9 Drawing Sheets

ARTIFICIAL INTELLIGENCE SYSTEM AND METHOD FOR PROCESSING MULTILEVEL BILLS OF MATERIALS

BACKGROUND OF THE INVENTION

The present disclosure generally relates to bill of material (BOM) management systems, and in particular relates to an artificial intelligence BOM management system for processing multilevel bills of materials using an automatic adaptation method.

A conventional BOM consists of a list of parts or components that are required to construct a product or an assembly, and provides unique part identifiers and corresponding quantities needed for each component. Typically, the BOM is a multilevel document that provides product-related data for main assemblies and their associated sub-assemblies (i.e., components within components), and includes the part identifiers and an approved manufacturers list for each assembly and sub-assembly. Also included in the BOM are reference files, such as part specifications, Computer Aided Design (CAD) files, and other schematics.

During development and manufacturing processes of the product, its components are listed in a structured item list, namely the BOM. Generally, the BOM serves as a method of managing and tracking product parts changes or modifications, and maintaining a reliable, accurate list of requisite components. Further, the BOM may also be used as an index or organizational tool for the documentation of the product's components as component datasheets and mechanical drawings. Further included in the BOM are other reference items, such as tooling or agency certifications that are not included in the product itself, but are required for its manufacture.

Different domains and departments of a company, such as Engineering, Manufacturing, Customer Services, and the like, independently manage the BOM. In many cases, the BOM associated with each domain acts as a primary reference for product data when transferring product information from one domain to another domain. As the product evolves or changes in an Engineering or Manufacturing process by replacing the assembly or sub-assembly with improved components, the need for accuracy and integrity in the BOM becomes very important. Costly errors in the BOM typically include incompleteness, inconsistency, and incorrectness.

Multiple BOMs may be used, each BOM representing different functional company domain for an identical product. Each domain generates its own BOM that is distinct from the BOMs associated with the other domains. For example, an Engineering department may have their own BOM for the identical product, namely EBOM. Also, manufacturing and customer services departments may have their own BOMs, MBOM and SBOM respectively. These BOMs are typically stored in different, dissimilar databases in various locations of the company. During a lifecycle of the product, the BOMs, such as EBOM, MBOM, and SBOM, carrying essentially identical information about the components of the product are separately managed by each domain. When one or more components are updated or replaced with different components for the product in one domain, such changes are manually informed, adapted, and propagated to the other domains so that the accuracy and reliability of each BOM is maintained throughout the company.

U.S. Pat. No. 8,032,516 discloses methods and systems of presenting a user with a unified bill of materials from multiple bills of materials, respectively stored in different databases. The method disclosed in the '516 patent uses a taxonomy system and a semantic based ontology model to link product information from different BOMs, such as EBOM and MBOM. More specifically, a query is received from a user to inquire the taxonomy system using a keyword. The taxonomy system utilizes the semantic based ontology model to generate queries to be performed on related databases. The user receives query results from the databases in an organized format.

Such conventional methods do not provide a simple method of identifying and retrieving a correct BOM associated with the product for the domain because multiple standards exist among the various domains. Identifying the correct BOM is a challenging process when using the conventional methods because the domain-specific BOMs are often inconsistent and incompatible with the other domains due to different data types and configurations of each BOM, thereby making the retrieval process of the correct BOM very difficult and time-consuming.

Moreover, the method disclosed in the '516 patent is an "a posteriori" oriented approach in that the method deals with integrating product information from different BOMs only after the links between the components of the products in different BOMs have already been established. In other words, the '516 method does not improve the usual work processes between company domains. The users of each domain continues to use the same methods of work, especially in the manual adaptation and propagation processes of the product change information needed between the domains (e.g., between EBOM and MBOM).

Another disadvantage of the '516 method is that the users cannot determine "a priori" the impacts of assembly changes in a specific domain on a respective assembly in the other domains. Thus, a cost of performing the adaptation and propagation processes for the assembly changes becomes expensive and labor-intensive. Further, before performing such adaptation and propagation processes, the users must know exactly what product information is needed in searching for the correctly linked BOMs in different domains. As a result, generating the unified BOM from multiple domains can be very tedious and complicated process.

Therefore, there is a need for developing an improved BOM management system and method such that the BOM is maintained and transferred accurately and reliably between company domains without compromising the consistency and integrity of the BOM.

SUMMARY OF THE INVENTION

The above-identified need is met by the present BOM management system, in which flexibly managing the BOMs between different domains, and readily propagating consistent product configuration information are provided. A related advantage of the present BOM management system is that the adaptation and propagation processes of the product changes are performed using artificial intelligence that monitors updates and modifications of each assembly of the product. The present BOM management system reshapes the product configuration management by making a product view of the BOM flexible between upstream and downstream processes and enhancing product data connectivity.

More specifically, the present system allows different functional domains to manage their own product views. It ensures consistent and automatic adaptation and propagation processes of the product changes by using dynamic links connecting components of the BOMs in different domains, thereby saving significant time and deployment costs. Thus, the integrity of the product configuration information is enhanced between the functional domains, and the continuity of such information is accurately afforded to downstream users, such as suppliers and customers.

These advantages are achieved by the present BOM management system which includes a file server having a plurality of databases for storing specific product information relating to associated assemblies and sub-assemblies. The present BOM management system further includes a processor coupled to databases and programmed to perform tasks and display product BOM information for different functional domains via a network. As an example, client systems are connected to the file server using a web browser, such that the file server is accessible to the client systems using the Internet. It is contemplated that other suitable networks can be used, such as a corporate Intranet, a local area network (LAN) or a wide area network (WAN), and the like, using dial-in connections, cable modems, high-speed ISDN lines, and other types of communication methods known in the art.

The foregoing and other aspects and features of the disclosure will become apparent to those of reasonable skill in the art from the following detailed description, as considered in conjunction with the accompanying drawings.

DETAILED DESCRIPTION OF THE PREFERRED EMBODIMENTS

Preferred embodiments of the present disclosure are described below by way of example only, with reference to the accompanying drawings. Further, the following description is merely exemplary in nature and is in no way intended to limit the disclosure, its application, or uses. As used herein, the term "module" may refer to, be part of, or include an Application Specific Integrated Circuit (ASIC), an electronic circuit, a processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Figure 1:
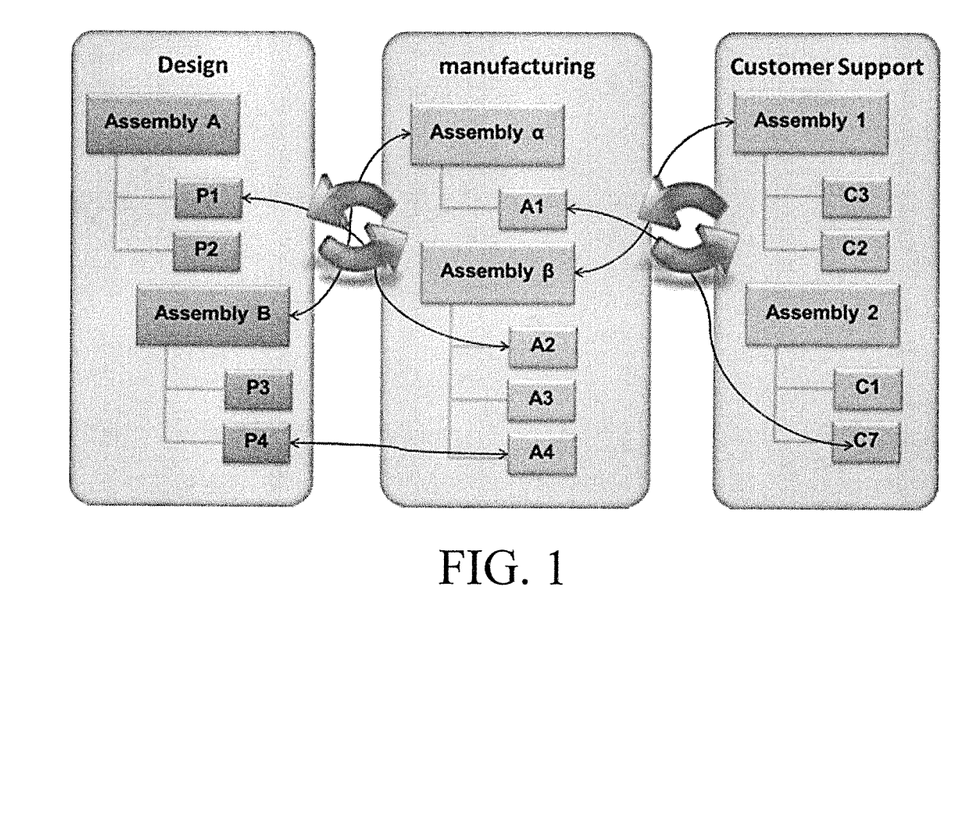
FIG. 1 is an exemplary illustration of a product view featuring dynamic links between components across different functional domains in accordance with an embodiment of the present BOM management system.

Referring now to FIG. 1, the present BOM management system utilizes dynamic links configured for connecting components of assemblies between the BOMs across different functional domains. Mapping assemblies and corresponding components of each product between functional domains is achieved without a rigid product hierarchical structure. For example, design, manufacturing, and customer support departments share the dynamic links of the components in a flexible and dynamic way by connecting the components via pointers without regard to the hierarchical structure of each assembly. As shown in FIG. 1, a component P1 of Assembly A in a Design BOM is linked to a component A2 of Assembly β in a Manufacturing BOM, and a component P4 of Assembly B in the Design BOM is linked to a component A4 of Assembly β in the Manufacturing BOM even if the Assembly B having the component P4 is linked to an Assembly α that does not have the component A4. As such, a respective product view of the BOM in each functional domain provides traceable links between upstream and downstream product processes, and enhances the product data connectivity between functional domains.

Figure 2:
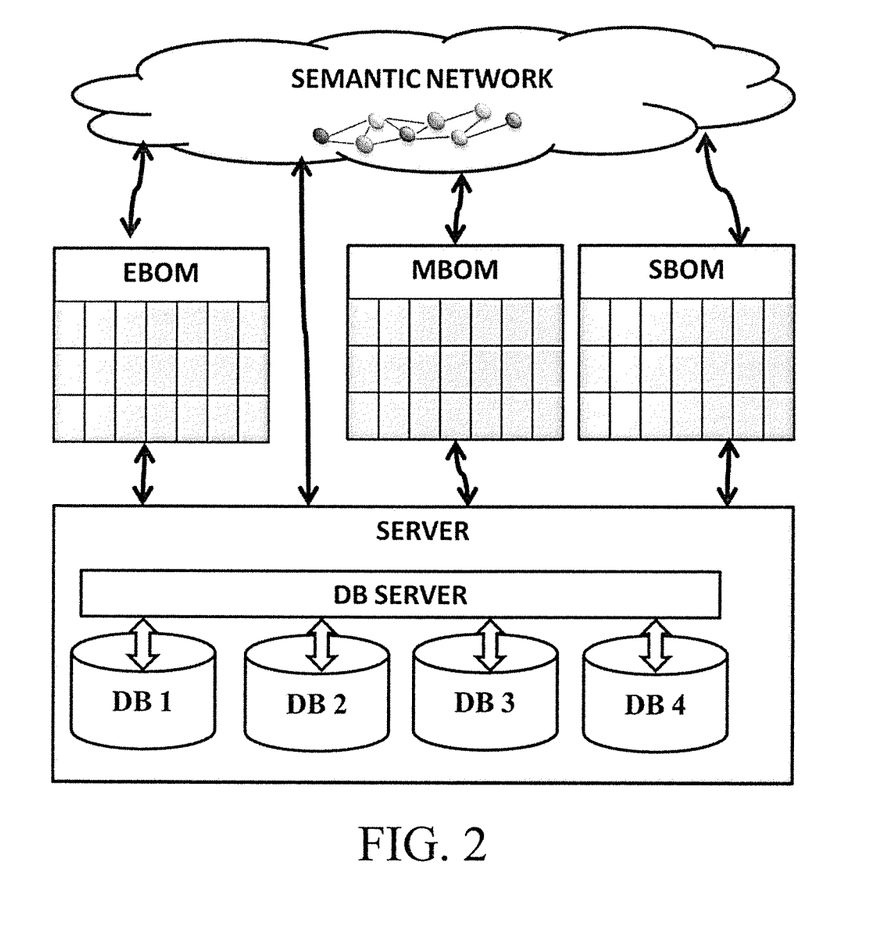
FIG. 2 is a schematic diagram of the present BOM management system featuring a semantic network that interacts with BOMs from different functional domains.

Referring now to FIG. 2, it is preferred that the present BOM management system includes a semantic network that is configured to interact with the BOMs. The semantic network includes an overlay of metadata connecting all product-related data from different databases in the different functional domains. As discussed in greater detail below, the semantic network can be converted into a computer-readable map for executing multiple functions via a network. Semantically enabled connections between the BOMB from various functional domains, such as EBOM from Engineering, MBOM from Manufacturing, and SBOM from Customer Support, provide effective context communication between the BOMB. Each BOM is connected to a file server having one or more databases (e.g., DB1, DB2, DB3, and DB4) for storing BOM-related product information, and the file server is coupled to the semantic network for the context communication between the heterogeneous functional domains.

All relevant product information can be stored in the databases for retrieval by the present BOM management system, e.g., as a data storage device and/or a machine readable data storage medium carrying computer programs. A database (DB) server is provided for accessing, retrieving, and organizing the BOM-related product information stored in the databases. Through a communication connection between the semantic network and the file server, the retrieved product information can be shared between the BOMs. All BOM data are "a priori" linked according to product knowledge stored in the semantic network. The product knowledge includes existing relationship information, such as the dynamic links, between the assemblies and components of the products in all functional domains. The file server has simultaneous access to the databases, DB1-DB4, and to the product knowledge of the semantic network, and supports concurrent access to the BOMs, the databases, and the semantic network for multiple users.

Figure 3:
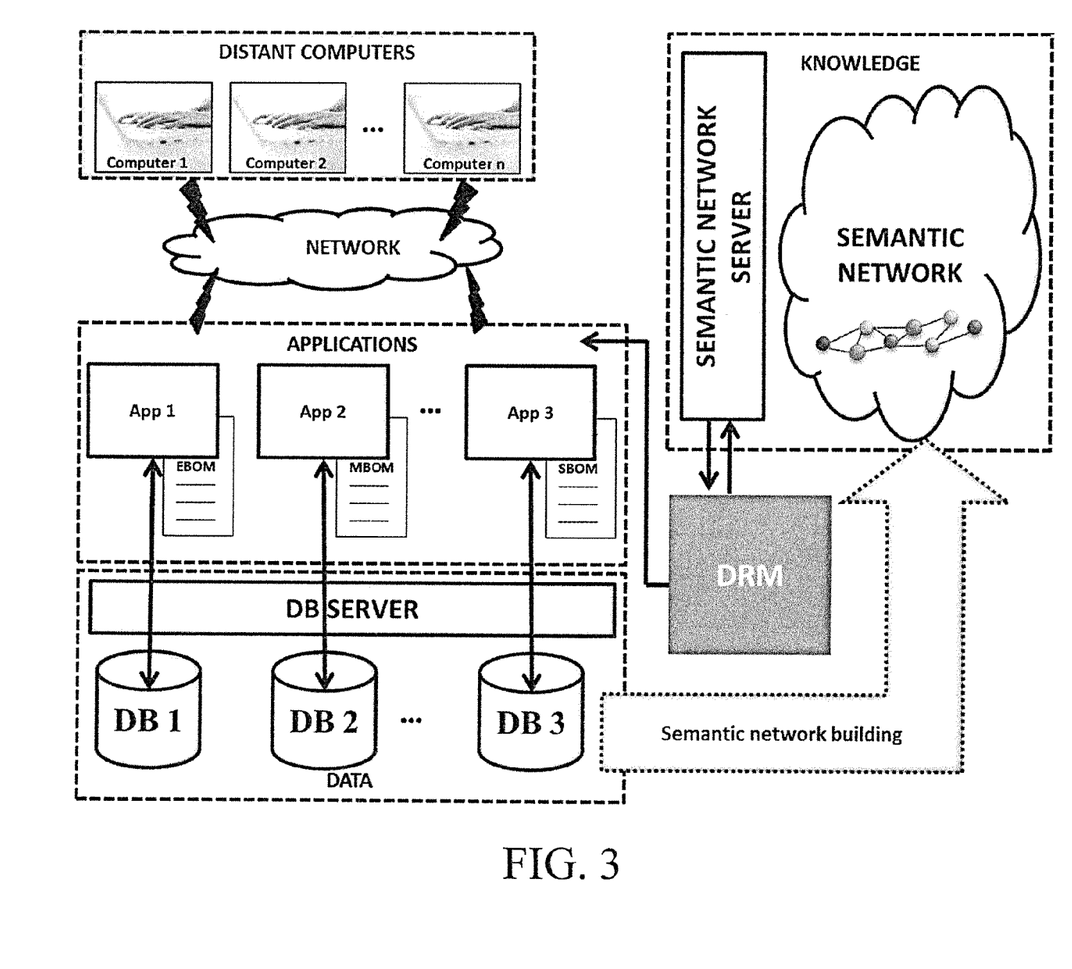
FIG. 3 is an exemplary global architecture of the present BOM management system featuring a Decompose/Recompose/Multi-arrange (DRM) process module.

Referring now to FIG. 3, further included in the present BOM management system is a Decompose/Recompose/Multi-arrange (DRM) process module that manages product information or data flows in the present system using the databases, DB1-DB4, and the semantic network. Initially, the users from different functional domains log onto their computers, Computer 1, Computer 2, and Computer N, for launching their respective business applications, App1, App2, and App3, such as a product data management (PDM) system and a computer aided three-dimensional interactive application (CATIA) via a network. Each application is used in a distinct functional domain, and is coupled to a dedicated database based on a corresponding functional field or domain. Also included in the present system is a network, which provides an interface between the computers, Computer 1-3, and the applications, App1-3. The interface network also controls communications between the applications, the databases, and other related system devices, services, and applications. The other devices, services, and applications may include, but are not limited to, one or more software or hardware components, as are known in the art.

Each application provides a user with a specific BOM. For example, the application App1 in the Engineering domain provides the user with the EBOM stored in the database DB1, and similarly the application App2 in the Manufacturing domain provides the user with the MBOM stored in the database DB2. Further, each application is coupled only to its corresponding database specific to the associated domain. One aspect of each application App1-3 is that a read and write access to the corresponding BOM is given to the user such that the application does not share the product information stored in the databases DB1-3 with the other BOMs from different domains. For example, the application App1 is connected only to the database DB1 for updating the EBOM in the Engineering domain.

Another aspect of the present system is that the DRM process module monitors the semantic network and the product data changes including the dynamic links associated with the products listed in the BOMs. When the DRM process module detects one or more product data changes in one BOM, it transmits product information relating to the changes, including the dynamic links, to the other BOMs so that the components of the changed product are properly linked in the other domains. The product information, also known as an intelligent layer, is defined by the product knowledge stored in the semantic network as the product knowledge has information about the existing links between the product assemblies and components.

For example, the semantic network may be built using the data integration technologies known in the art. An important aspect of the present system is, however, the real-time integration of updated data stored in multiple data sources. The product information encapsulated in the semantic network includes descriptions and pointers/links to specific product data stored in the data sources.

When a new dynamic link is added in the semantic network, for example, the DRM process module detects the new link in the product knowledge, and generates a warning signal or message for informing other users of this change. The warning message may include the product configuration information as to how the change impacts the other BOMs in different domains. Additionally, the DRM process module transmits the product configuration information relating to the new link to the other applications for propagating the change to the other BOMs in different domains.

Using the product knowledge gained from the new dynamic link, the DRM process module causes the other applications to automatically create the same link in the corresponding BOMs in the other domains that do not have the change. In the semantic network, the new link is also added in the product knowledge by the DRM process module for further propagation. Such propagation of the product configuration change is performed by the DRM process module for not only creating the new link but also adding missing components or assemblies of the changed product in all related BOMs based on the product knowledge change of the semantic network.

As an example only, one or more product configuration changes occur in the Engineering domain, and the changes are applied to the EBOM by the user using the business application App1. These changes are also applied to the product knowledge of the semantic network by the DRM process module. It is preferred that the product knowledge and the semantic network are controlled and managed by a semantic network server. The semantic network server is communicatively coupled to the DRM process module for receiving the changes from the DRM process module.

The DRM process module monitors the semantic network for any product configuration changes including updates, deletions, and additions of any dynamic links of the products in the EBOM. When the DRM process module detects the changes in the Engineering domain, the DRM process module modifies the MBOM and the SBOM to reflect the same changes in the Manufacturing and Customer Services domains using the corresponding business applications App2 and App3. It is also contemplated that the DRM process module informs the users of the Manufacturing and Customer Services domains of the product changes by generating one or more warning signals or messages indicating how the changes impact on the MBOM and the SBOM. Further, the DRM process module may assist the users of the Manufacturing and Customer Services domains in modifying their MBOMs and SBOMs affected by the changes for adapting to a new business process implemented in the Engineering domain, which may be validated by a domain expert.

As discussed above, the present BOM management system provides an artificial intelligence system utilizing a machine learning method based on the product knowledge of the sematic network for seamlessly allowing connections between the related BOMs in different functional domains regardless of associated system types and geographical locations of the domains. The machine learning method is implemented based on the sematic network for identifying and linking the related BOMs between the domains as desired by the users in a consistent manner for multiple functional needs. Further, the contents of each BOM are accessed independently of corresponding database types and computing system environments.

Figure 4:
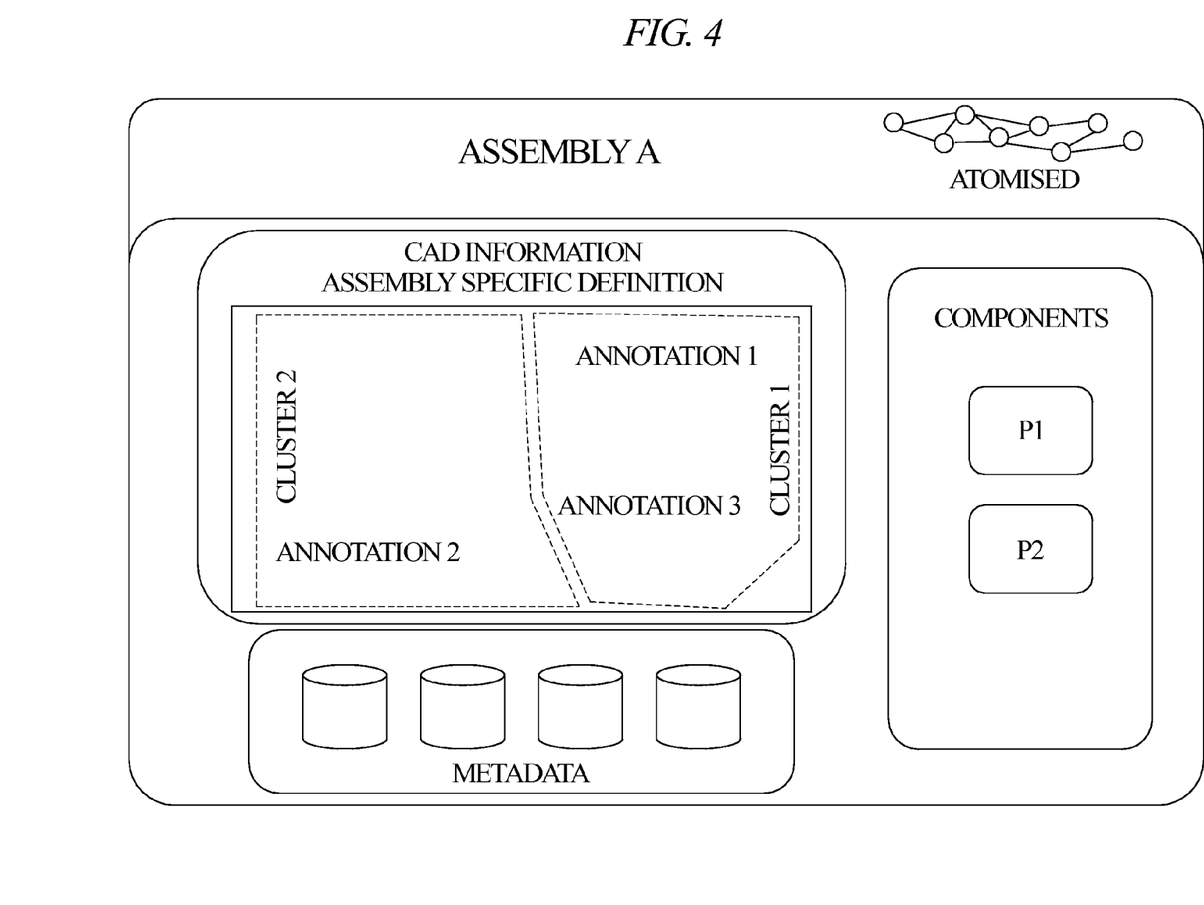
FIG. 4 is an exemplary visualization of a Decompose process of the present DRM process module.
Figure 5:
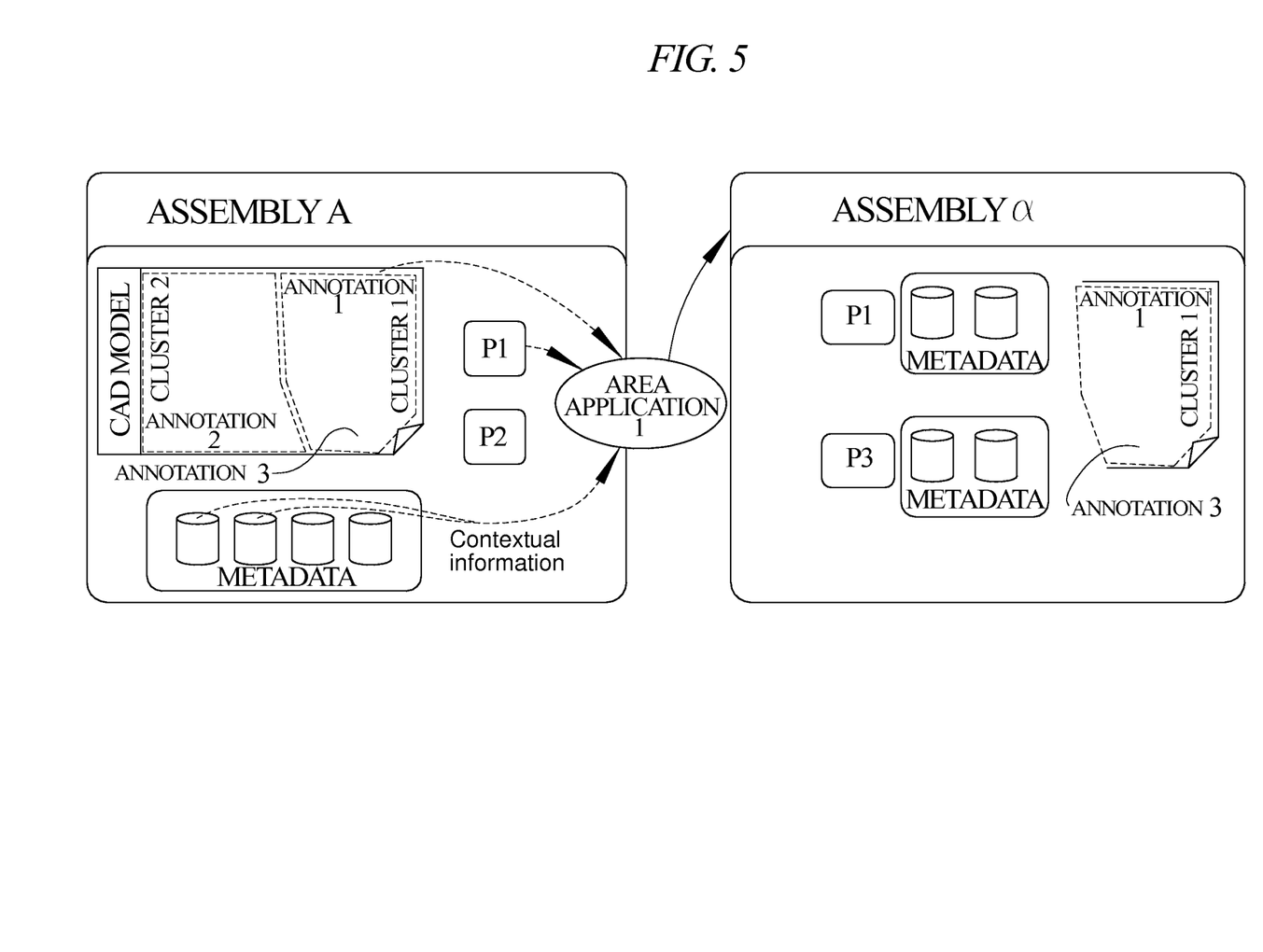
FIG. 5 is an exemplary visualization of a Recompose process of the present DRM process module.
Figure 6:
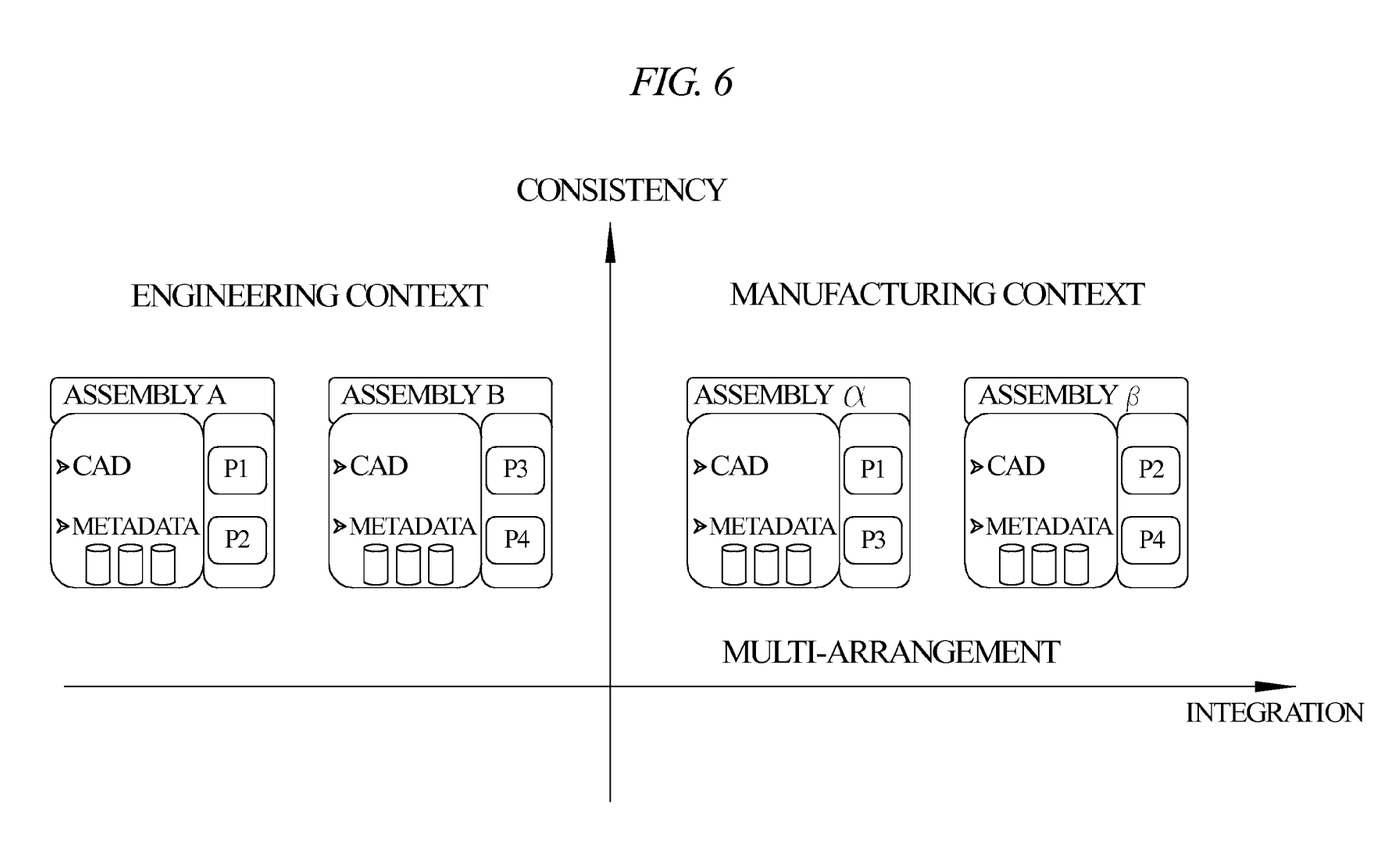
FIG. 6 is an exemplary visualization of a Multi-arrange process of the present DRM process module.

Referring now to FIGS. 4-6, a detailed description of the DRM process module is provided. It is preferred that the DRM process module performs at least three processes, namely a Decompose process, a Recompose process, and a Multi-arrange process. One or more of these processes may be performed by a child or sub-module(s) depending on different applications.

As is known in the art, the module may be implemented with a software system, and other variations, such as stand-alone controllers or configurable software modules within the present BOM management system. Although the children modules can reside in their respective parent modules, the broad teachings of the present system can be implemented in a variety of forms. Thus, while this disclosure includes particular examples and arrangements of the modules, the scope of the present device should not be so limited since other modifications will become apparent to the skilled practitioner.

FIG. 4 illustrates an exemplary visualization of the Decompose process, featuring a method of organizing the product data by grouping different elements of the BOMs as clusters of atomized data. More specifically, a granularity level at each assembly level of the product is lowered as defined in the product knowledge of the sematic network. All product elements of each BOM, such as assemblies and their components, reference files (e.g., CAD drawing files), and other metadata, are grouped together based on the product knowledge of the semantic network. For example, the information in the CAD files of the assembly A is related to two particular assemblies in another functional domain. Thus, the information is aggregated in two separate clusters, respectively Cluster 1 and Cluster 2. It is contemplated that the CAD files are clustered using suitable tags and text mining technologies known in the art.

For example, the metadata includes tags and contextual data, such as environment information, tasks, users related to the product, and the like. It is contemplated that the metadata is collected via an implicit or explicit method. The implicit method refers to an automatic collection of metadata having, at least, utilized applications, vocabularies, a detection of specific actions, user profiles, and the like related to the product. The explicit method refers to a manual collection of metadata having, at least, user tagging, user interaction results, "Effectivity" of each assembly which is a list of Manufacturing Serial Numbers, release dates, authors, geographical sections, and the like related to the product.

FIG. 5 illustrates an exemplary visualization of the Recompose process, featuring a method of regrouping the product data in a new or selected domain context while preserving the dynamic links between the assemblies and components of each product based on the product knowledge of the semantic network. It is preferred that an area application, Area Application 1, is used to recompose the product data based on requirements of the corresponding domain. For example, the area application, Area Application 1, collects the decomposed elements of the BOMs from the Engineering product databases for reassembling the elements based on the requirements of the Manufacturing domain. Thus, the Area Application 1 acts as a bridge between the functional domains for cascading the product information in the new context of each domain.

As shown in FIG. 5, one or more elements of the Assembly A in an Engineering context are used to recompose the elements of the Assembly α in a Manufacturing context. The elements of each assembly, Assembly A and Assembly α, are linked by the dynamic links based on the product knowledge of the semantic network. All elements of each assembly are dispatched from one assembly to the other assembly in the new functional domain context. For example, the component P1, a portion of the corresponding metadata, and a portion of the CAD file Cluster 1 of Assembly A are disassociated from the Assembly A, and recomposed in the Assembly α by the Area Application 1 in a new domain context as a Manufacturing view. All dynamic links between the elements across the functional domains are maintained and can be reused as they are, or can be modified in the new domain context to suit the situation.

FIG. 6 illustrates an exemplary visualization of the Multi-arrange process, featuring a method of rearranging the assemblies of the products across the different functional domains. Depending on a relationship structure of the product elements between the assemblies (e.g., one-to-one dependency), the present BOM management system adds, delete, or updates the assemblies in the upstream or downstream functional domains. Each product structure is viewed separately in the functional domains. This configuration allows flexibility in each domain such that adjustments of the product structure are readily achieved based on the requirements of the associated domain.

For example, the BOM in the Engineering context (EBOM) can be multi-arranged to facilitate a different product structure of the BOM in the Manufacturing context (MBOM). As a result, the EBOM can be dispatched in multiple MBOMs. An important aspect of the Multi-arrange process is that the "a priori" dynamic links between the elements of the product are used in heterogeneous systems and different functional domain contexts. Thus, all lower level product data of the product structure are linked or connected regardless of the domain contexts and systems.

Figure 7:
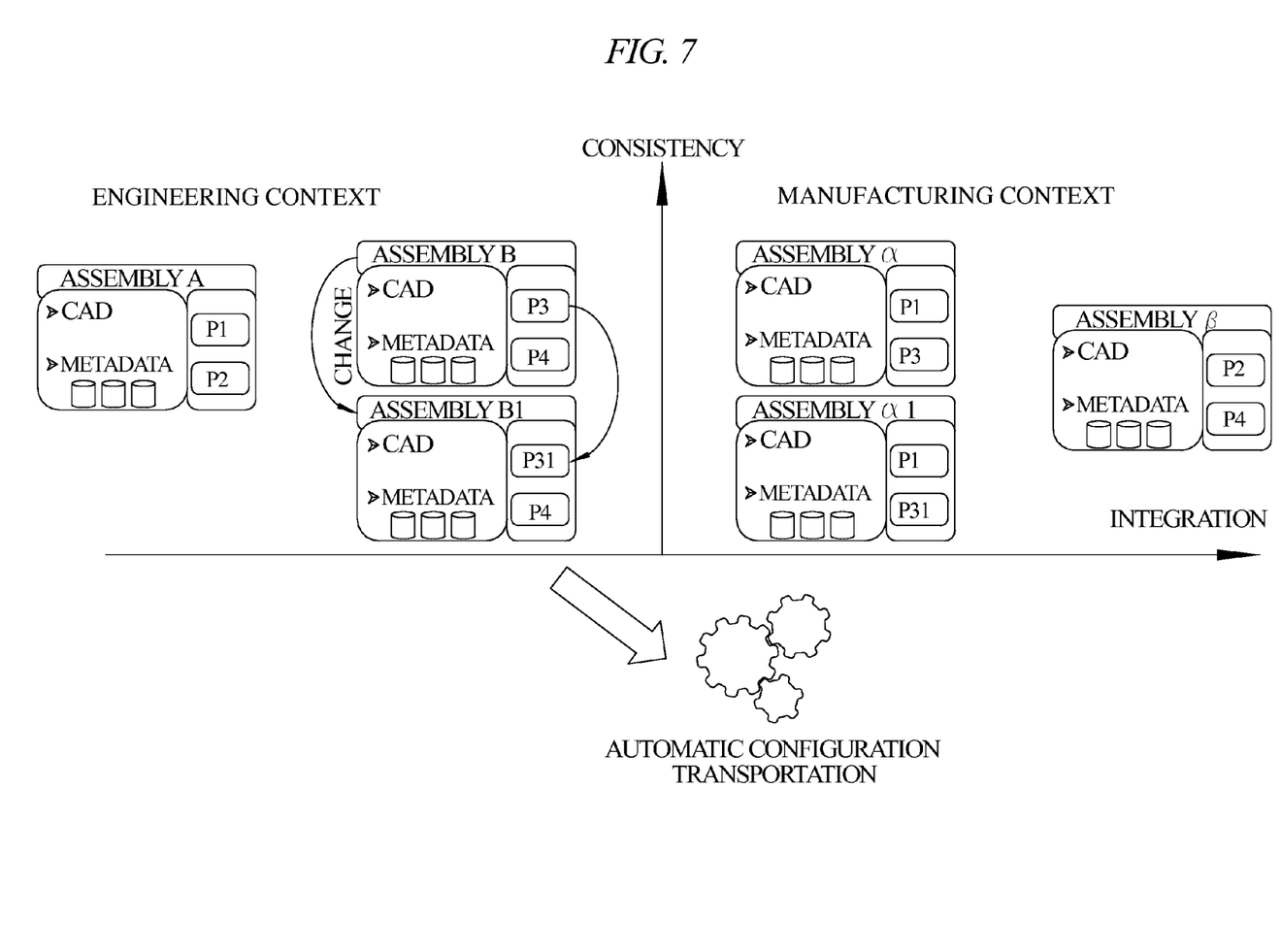
FIG. 7 is a schematic diagram of an exemplary automatic configuration transportation engine of the present BOM management system.

Referring now to FIG. 7, it is preferred that an automatic configuration transportation engine is used to resolve the problem of managing product structure changes without impacting other functional domains. For achieving consistent product configuration transportation between the domains, the automatic configuration transportation engine automatically launches the Recompose and Multi-arrange processes for any changes in the product assemblies. As a result, the present BOM management system intelligently propagates the product configuration information to downstream or upstream product processes.

For example, the Assembly B1 denotes a new product design solution of the Assembly B and in that the part or component P31 of Assembly B1 replaces the part P3 of Assembly B in the Engineering context. A corresponding assembly of Assembly B1 in the Manufacturing context is named as Assembly α1 in the Manufacturing domain. The replaced part P3 is used in the Assembly α in the Manufacturing context, and the Assembly α is similarly replaced by the Assembly α1 having the new part P31. As a consequence of the product design or configuration changes in the Engineering context, the automatic configuration transportation engine informs the present BOM management system of which elements of the MBOM are impacted by the EBOM changes. Further, the present BOM management system can assist the users of the MBOM in updating the Assembly α1 based on product information of the Assembly B1 using the automatic configuration transportation engine.

Such product information, also known as the intelligent layer, is defined by the product knowledge stored in the semantic network. Specifically, the product knowledge has information about the existing links between the product assemblies and components. While the conventional BOM management system lacks such a semantic layer, the present system having the intelligent layer semantically interprets the product data at the lowest level. This can be achieved based on the product information stored in the semantic network and the metadata. Based on these associations or relations between the product information processed at execution time, the present system connects or links the product elements according to the targeted functional domain requirements.

Figure 8:
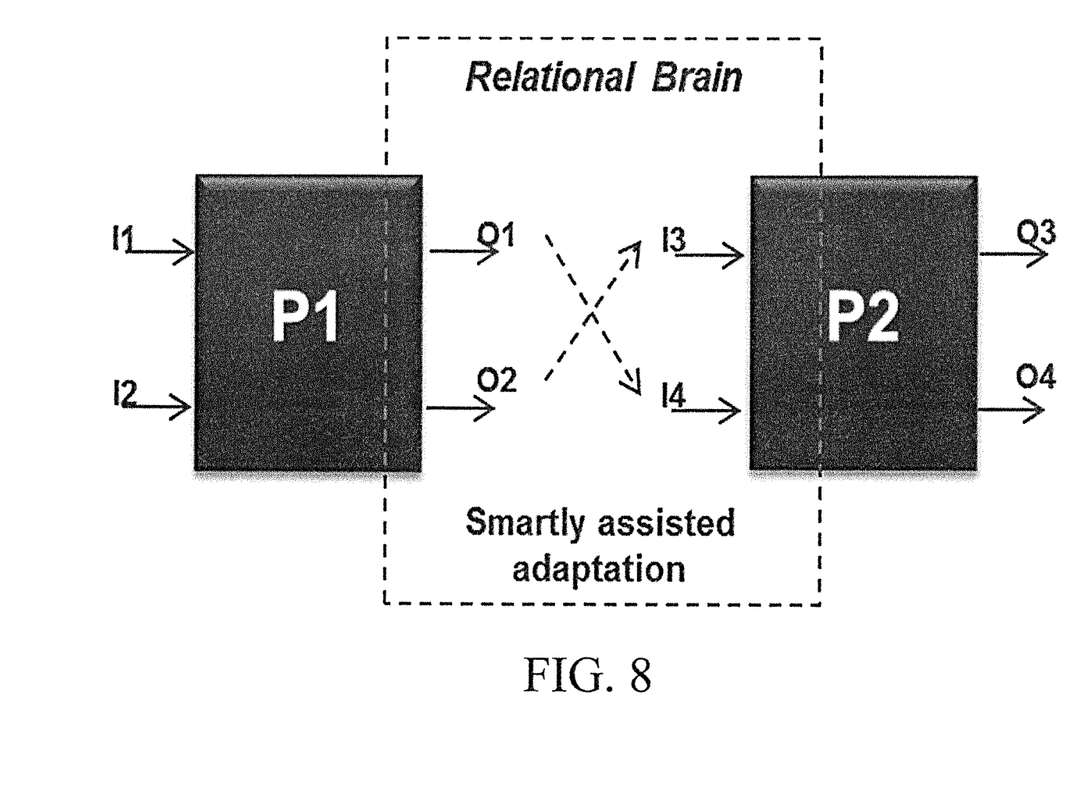
FIG. 8 is a schematic diagram of an exemplary relational brain module of the present BOM management system.

Referring now to FIG. 8, it is also contemplated that a relational brain module is used to manage dissimilar BOMs. More specifically, the relational brain module performs a machine learning process for supporting manual adaptation activities between the functional domains by dispatching one BOM (e.g., EBOM) to another corresponding BOM (e.g., MBOM) in a different domain. The relational brain module utilizes an inductive method of automatically adapting to the product changes among the different domains by repeating traces of manual adaptation activities performed by the users.

A learning algorithm is used for monitoring the activities of the users in various domains, and for recognizing repeating patterns of the product changes. As an example, the relational brain module monitors product change activities, such as manual product adaptations and propagations of the BOMs between two functional domains P1 (e.g., Engineering) and P2 (e.g., Manufacturing) for a predetermined period. When the relational brain module detects repeated adaptations of the product changes between the domains, the brain module updates the product knowledge of the semantic network based on the detection. In FIG. 8, an output O1 of a corresponding input I1 is linked to an input I4 of the domain P2. Similarly, an output O2 is linked to an input I3 of the domain P2. Based on an amount of the product knowledge available in the semantic network, the relational brain module gradually learns the patterns of the product changes between the domains, and automatically performs product adaptations for the users.

Exemplary inputs and outputs of the functional domains P1 and P2 include the following elements. The inputs I1 and I2 may include functional requirements, and the outputs O1 and O2 may include EBOMs or design solutions. The inputs I3 and I4 may include MBOMs or work orders, and the outputs O3 and O4 may include manufactured assemblies.

Figure 9:
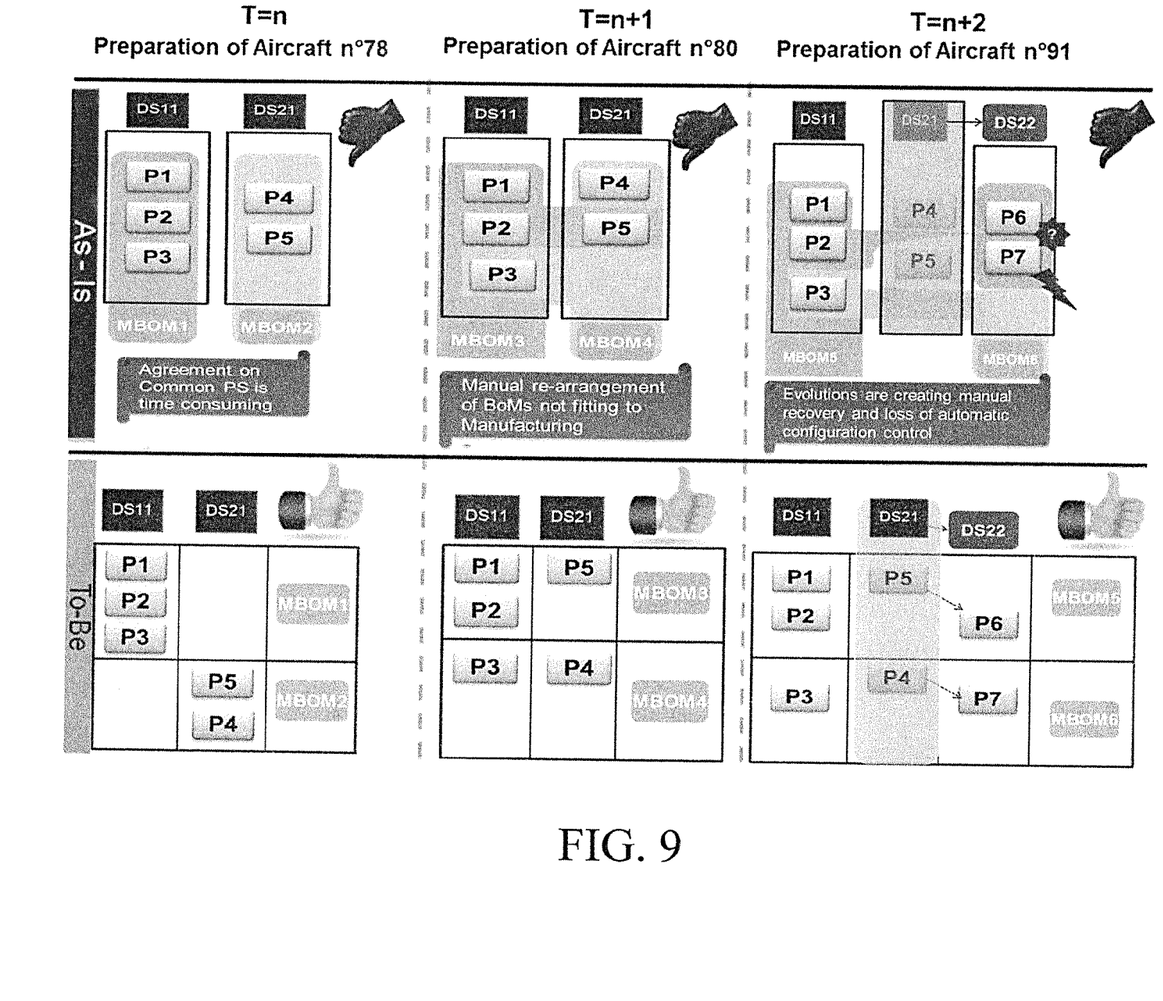
FIG. 9 is a graphical representation of an exemplary BOM management method of product structure changes in accordance with an embodiment of the present BOM management system.

Referring now to FIG. 9, an example of the BOM management method of product structure changes is shown in greater detail. An upper row illustrates a conventional way of managing the product structure or configuration changes between the functional domains, and a lower row illustrates an exemplary method of managing the same in accordance with an embodiment of the present BOM management system.

Conventionally, in the Engineering context, all components or parts related to corresponding assemblies are listed in the EBOM. Two assemblies DS11 and DS21 are typically validated by a chief engineer, and the chief engineer sends the assemblies DS11 and DS21 in the EBOM to a manufacturing engineer for manufacturing activities. The EBOM is redistributed in different manufacturing facilities as desired, and the assemblies DS11 and DS21 of the EBOM are manually adapted to corresponding manufacturing assemblies. Accordingly, each manufacturing facility has its own MBOM in the Manufacturing context. These manual adaptations between the domains are costly and time-consuming because the adaptations are repeated in every manufacturing facility for all product configuration changes.

For example, when the chief engineer updates the EBOM to replace one part with a different part in the assembly DS21 in the Engineering domain, a configuration manager manually creates a new assembly DS22 to replace the DS21 in the Engineering context. The manufacturing engineer receives the new assembly DS22 and manually analyzes how the new assembly DS22 must be adapted to the existing corresponding MBOMs. As a result, the manufacturing engineer manually and repeatedly updates each MBOM without using any BOM management system.

In contrast, when using the present BOM management system, the chief engineer can foresee the impacts of the EBOM changes in the downstream processes of the Manufacturing domain because the elements of the BOMB are linked between the domains. Moreover, the present BOM management system can assist the manufacturing engineer in updating the MBOMs without performing unnecessary manual tasks described above. Thus, the manufacturing engineer only needs to validate the new or updated assemblies generated by the automatic configuration transportation engine.

In the first column (preparation of aircraft 78) of the AS-IS row, a common Product Structure (PS) is shared between the Engineering and Manufacturing fields or departments. More specifically, all parts of one assembly (EBOM) are shared with its respective manufacturing one (MBOM). For example, the assembly DS11 in the engineering field and its related MBOM1 in the manufacturing field share the same parts: P1, P2 and P3. In this case, there is no manual adaptation between the two fields. However, the agreement of a common PS between the engineering and manufacturing fields is costly and time consuming. With the present BOM management system (as shown in a first column of the TO-BE row), there is no need for such costly prerequisite and conditions. Every field has its own functional view on the PS, i.e. there is an engineering view of the assemblies (DS11, DS21) and a separate manufacturing view of the assemblies (MBOM1, MBOM2). The role of the present BOM management system is to automatically match the two views without manual adaptation.

In the second column (preparation of aircraft 80) of the AS-IS row, the Manufacturing BOMs has evolved or revised (e.g. lean manufacturing). Consequently, the MBOM3, for example, will use parts from the two assemblies (DS11, DS21). In this case, there is no common PS agreement between the two functional fields. Thus, the manual arrangement of the evolving MBOMs is performed to synchronize the BOMs between the fields or departments. In other words, the EBOMs are redistributed in different manufacturing facilities to fit the manufacturing assemblies (MBOMs). With the present BOM management system (second column of the TO-BE row), the different assemblies across the functional domains are smartly connected based on the semantic network. The present BOM management system automatically dispatches all parts from the corresponding assembly in the engineering field (e.g. DS11) to the adequate assembly in the manufacturing field (e.g. MBOM3). Notably, two different views are provided for the assemblies based on the functional field. For example, in the engineering field, the assembly DS11 still contains the Parts P1, P2 and P3, but in the manufacturing field, the related assembly becomes MBOM3 with parts P1, P2 and P5.

In the third column (preparation of aircraft 91) of the AS-IS row, the Engineering assembly DS21 has evolved or revised. For example, the assembly DS21 is replaced by the DS22. The assembly DS22 contains two new parts: P6 and P7. This kind of evolution necessitates a manual recovery to dispatch the new parts P6, P7 in the corresponding MBOMs. The manufacturing engineers need to study the Engineering PS and BOMs to compose MBOM5 and MBOM6. With the present BOM management system (third column of the TO-BE row), an automatic transposition of the change is performed when the present BOM management system detects an evolution or revision on the engineering assembly. The present BOM management system automatically matches the new parts P6, P7 with the existing ones and informs the manufacturing engineer of the changes to automatically readjust the assemblies in the existing MBOMs. As a result, the present BOM management system knows that the parts P6 and P7 have evolved respectively from P5 and P4. Then, the MBOM5 and MBOM6 are created based on the matched new parts.

While preferred embodiments of the disclosure have been herein illustrated and described, it is to be appreciated that certain changes, rearrangements and modifications may be made therein without departing from the scope of the disclosure.

The invention claimed is:

1. A bill of material (BOM) management system for processing a product data or configuration change of a product between a plurality of BOMs, each BOM with a corresponding functional domain, comprising:
- a plurality of product elements associated with each BOM, each product element defining at least one assembly, each assembly having at least one component of a corresponding assembly, both the assembly and the component being listed in a corresponding BOM as a product element of the product;
- a dynamic link that maps and connects each component of the assembly in a first BOM disposed in a first file server of a first functional domain to a corresponding component of the assembly in a different, second BOM disposed in a second file server of a second functional domain;
- a semantic network having a product knowledge that interacts with the corresponding BOM using a computing network connecting the first and second file servers, the product knowledge having information about the dynamic link; and
- a Decompose/Recompose/Multi-arrange (DRM) process module that manages product configuration information of the product, the DRM process module having a computer processor, executing computer-executable instructions, to perform a decompose process, a recompose process, and a multi-arrange process,
- wherein, using the computer processor, the DRM process module detects a changed product having the product data or configuration change of the product in each BOM of the corresponding functional domain, the DRM process module transmits product information relating to the product data or configuration change, including the dynamic link, from the first BOM to the second BOM so that each component of the changed product in the first BOM is linked to the corresponding component of the second BOM,
- wherein, using the computer processor, the DRM process module performs the decompose process by grouping the product elements based on the product knowledge of the semantic network, performs the recompose process by regrouping the product elements in a selected domain context, and performs the multi-arrange process by rearranging the product elements to propagate the product data or configuration change of a product structure in the first BOM of the first functional domain to another product structure in the second BOM of the second functional domain via the computing network, and
- wherein, using the computer processor, the DRM process module automatically creates and adds a new dynamic link in the product knowledge for the propagation for reflecting the same product data or configuration change of the changed product in the first BOM into the second BOM based on determining that the product data or configuration change of the changed product in the first BOM does not exist in the second BOM.

2. The BOM management system of claim 1, wherein a respective product view of the corresponding BOM in each functional domain provides traceable links between upstream and downstream product processes, and enhances the product data connectivity between functional domains.

3. The BOM management system of claim 1, wherein the semantic network includes an overlay of metadata connecting all product-related data from different databases in the different functional domains.

4. The BOM management system of claim 1, wherein the semantic network is converted into a computer-readable map for executing multiple functions via a network using semantically enabled connections between the plurality of BOMs.

5. The BOM management system of claim 1, wherein each BOM is connected to the respective first or second file server having one or more databases for storing BOM-related product information, and the respective first or second file server is coupled to the semantic network for context communication between heterogeneous functional domains.

6. The BOM management system of claim 1, wherein BOM-related product information is linked according to product knowledge stored in the semantic network.

7. The BOM management system of claim 6, wherein the product knowledge includes existing relationship information between the at least one assembly and the at least one component of the products in the plurality of functional domains.

8. The BOM management system of claim 1, wherein the DRM process module monitors the semantic network and product data changes including the dynamic links associated with the products listed in the plurality of BOMs.

9. The BOM management system of claim 1, wherein an intelligent layer is defined by the product knowledge stored in the semantic network as the product knowledge, having information about existing dynamic links between the product assemblies and components.

10. The BOM management system of claim 1, wherein when a new dynamic link is added in the semantic network, the DRM process module detects the new link in the product knowledge, and generates a warning signal or message for informing other users of this change.

11. The BOM management system of claim 10, wherein the warning signal or message includes product configuration information as to how the change impacts the other BOMs in different domains.

12. The BOM management system of claim 1, wherein the DRM process module transmits product configuration information relating to a new dynamic link to other applications for propagating a product data change to the other BOMs in different domains.

13. The BOM management system of claim 12, wherein based on the product knowledge gained from the new dynamic link, the DRM process module causes other applications to automatically create a dynamic link in the corresponding BOMs in the other domains that do not have a corresponding product data change.

14. The BOM management system of claim 1, wherein the new dynamic link is added in the product knowledge by the DRM process module for further propagation for creating the new link and adding missing components or assemblies of the changed product in all related BOMs based on the product knowledge change of the semantic network.

15. The BOM management system of claim 1, wherein the BOM management system provides an artificial intelligence system utilizing a machine learning method based on the product knowledge of the sematic network for seamlessly allowing connections between the related BOMs in different functional domains regardless of associated system types and geographical locations of the domains.

16. The BOM management system of claim 15, wherein the machine learning method is implemented based on the sematic network for identifying and linking the related BOMs between the domains as desired by users in a consistent manner for multiple functional needs.

17. The BOM management system of claim 1, further comprising an automatic configuration transportation engine that manages product configuration changes without impacting other functional domains by automatically launching the Recompose and Multi-arrange processes for any changes in the product.

18. The BOM management system of claim 1, further comprising a relational brain module that performs a machine learning process for supporting manual adaptation activities between the functional domains by dispatching one BOM to another corresponding BOM in a different domain, using an inductive method of automatically adapting to product changes among different domains by repeating traces of manual adaptation activities performed the users.

19. A method of managing a bill of material (BOM) for processing a configuration change of a product between a plurality of BOMs, each BOM with a corresponding functional domain, comprising:
  identifying and listing a plurality of product elements associated with each BOM, each product element defining at least one assembly, each assembly having at least one component of a corresponding assembly, both the assembly and the component being listed in a corresponding BOM as a product element of the product;
  mapping and connecting each component of the assembly in a first BOM disposed in a first file server of a first functional domain to a corresponding component of the assembly in a different, second BOM disposed in a second file server of a second functional domain using a dynamic link;
  interacting with the corresponding BOM using a computing network connecting the first and second file servers, based on a product knowledge of a semantic network having information about the dynamic link;
  providing a computer processor, executing computer-executable instructions, to perform a decompose process, a recompose process, and a multi-arrange process for managing product configuration information of the product;
  detecting a changed product having the configuration change of the product in each BOM of the corresponding functional domain;
  providing a separate functional view of a product structure of the corresponding BOM shared between the plurality of BOMs in the corresponding functional domains based on a corresponding functional field; and
  using the computer processor, wherein the decompose process performs grouping of the product elements based on the product knowledge of the semantic network, the recompose process performs regrouping of the product elements in a selected domain context, and the multi-arrange process performs rearranging of the product elements to propagate the configuration change of the product structure in the first BOM of the first functional domain to another product structure in the second BOM of the second functional domain via the computing network, and
  using the computer processor, wherein a new dynamic link is automatically created and added in the product knowledge for the propagation for reflecting the same configuration change of the changed product in the first BOM into the second BOM based on determining that the product data or configuration change of the changed product in the first BOM does not exist in the second BOM.

* * * * *